United States Patent [19]

Kawasaki

[11] 3,876,889

[45] Apr. 8, 1975

[54] INFORMATION MEMORIZING APPARATUS

[75] Inventor: Masahiro Kawasaki, Tokyo-to, Japan

[73] Assignee: Asahi Kogaku Kogyo Kabushiki Kaisha, Tokyo-to, Japan

[22] Filed: Sept. 19, 1973

[21] Appl. No.: 398,698

[30] Foreign Application Priority Data

Sept. 22, 1972 Japan .................................. 47-94584

[52] U.S. Cl. ................ 307/311; 307/228; 307/246; 307/251; 328/151; 328/182; 328/183; 328/184

[51] Int. Cl. ...... H03k 3/42; H03k 3/33; H03k 4/50

[58] Field of Search ....... 307/246, 251, 235 A, 228, 307/311; 328/151, 182, 127, 181, 183, 184, 185

[56] References Cited

UNITED STATES PATENTS

| | | | |
|---|---|---|---|
| 3,448,293 | 6/1969 | Russell | 307/251 |
| 3,482,174 | 12/1969 | James | 307/251 X |
| 3,559,107 | 1/1971 | Morgan et al. | 307/205 X |
| 3,708,694 | 1/1973 | Evans | 307/251 X |
| 3,743,952 | 7/1973 | Comley, Jr. et al. | 328/151 X |
| 3,753,132 | 8/1973 | Hill | 307/251 X |

OTHER PUBLICATIONS

Merryman, "Making Light of the Noise Problem," Electronics (pub.), pp. 52–56, 7/26/1965.

Rabinowitz, "Photocells, Types, Characters and Applications," Electronics World (pub.), pp. 23–26, 76, 9/1968.

Hession et al., "Field-Effect Transistor Detector Amplifier Cell," IBM Tech. Discl. Bull, Vol. 13, No. 9, pp. 2822, 2/1971.

DeParna, "Signal is Sampled and Held for 1 Minute," Electronics (pub.), pp. 71–72, 5/1/1967.

*Primary Examiner*—Michael J. Lynch
*Assistant Examiner*—L. N. Anagnos
*Attorney, Agent, or Firm*—Christie, Parker & Hale

[57] ABSTRACT

A field effect transistor is controllably biased to switch between conductive and non-conductive conditions. One of its electrodes, preferably the source, is coupled to a memory capacitor, and another of its electrodes, preferably the drain, is coupled to a signal source that provides an input signal to be memorized. Advantageously, the signal source is a photosensitive element such as a photo diode or photovoltaic element. While the field effect transistor is conductive, the memory capacitor is charged in accordance with the input signal by current flowing in series through the field effect transistor and capacitor. A feedback arrangement provides for maintaining a substantially constant bias while the field effect transistor is conductive.

8 Claims, 2 Drawing Figures

INFORMATION MEMORIZING APPARATUS

CROSS REFERENCE TO RELATED APPLICATION

The present application is related to my copending application Ser. No. 396,894, filed Sept. 13, 1973, entitled LIGHT AMOUNT INTEGRATION MEANS which claims priority of Japanese Patent Application No. 1972–109,952.

BACKGROUND OF THE INVENTION

In general, this invention relates to information signal memorizing apparatus. More particularly, it relates to apparatus providing and storing an electrical signal indicative of light amount, and is adapted for use in connection with a photographic light metering system.

It has heretofore been proposed to integrate photocurrent for the purpose of developing a signal indicative of light amount. In one conventional technique, a transistor grounded-base circuit is provided. Disadvantages inhere in this technique, principally owing to the threshold voltage incident to the emitter-base junction voltage. In another technique, a series-type chopper circuit is provided. Problems are associated with this technique also, principally in the larger input voltage ranges.

SUMMARY OF THE INVENTION

The present invention is directed to apparatus that can instantaneously memorize an input signal. An important element of the apparatus is a field effect transistor.

The chief characteristic of a field effect transistor is that the resistance it presents to current flowing between its source and drain electrodes can be varied by bias voltage. In contrast to a conventional junction-type transistor, the output characteristic of a field effect transistor passes through the origin, with no offset voltage, and, further, leakage current is substantially lower than the collector-base leakage current of a junction-type transistor.

According to the invention, the field effect transistor is controllably biased to switch between conductive and nonconductive conditions. One of its electrodes, preferably the source, is coupled to a memory capacitor. Another of its electrodes, preferably the drain, is coupled to a signal source that provides an input signal to be memorized. In one embodiment, the signal source is a photo diode and the coupling of the transistor electrode thereto is a direct connection. In another embodiment, the signal source is a photovoltaic element and the coupling of the transistor electrode thereto is through a source-follower circuit. While the field effect transistor is conductive, the memory capacitor is charged in accordance with the input signal by current flowing in series through the field effect transistor and the capacitor. Significantly, a feedback arrangement provides for maintaining a substantially constant bias while the field effect transistor is conductive. Preferably, the substantially constant bias is such that the source and gate electrodes are at the same potential. As a result, the resistance presented by the field effect transistor between its drain and source electrodes is substantially unaffected by relatively large input voltages. Upon switching to its non-conductive condition, the voltage developed across the previously charged memory capacitor is stored, the capacitor thereby exhibiting memory.

DETAILED DESCRIPTION

Figure 1:
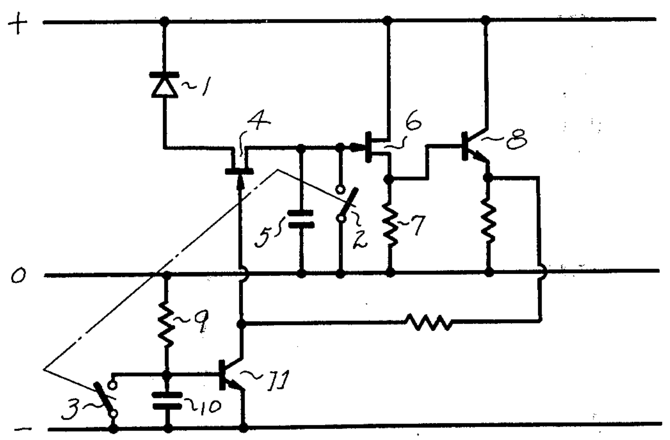
FIG. 1 is a schematic diagram showing one embodiment of the present invention.
Figure 2:
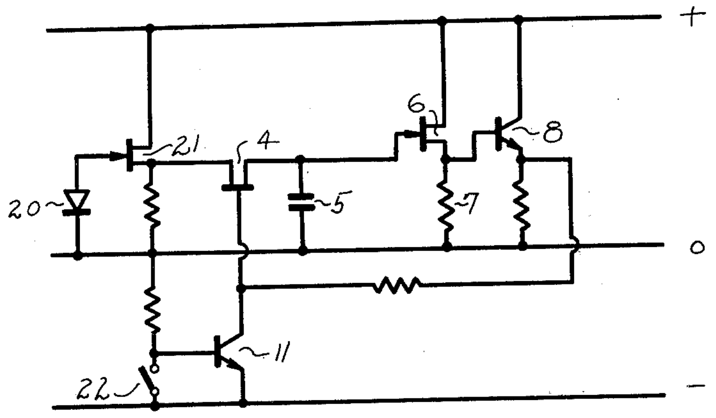
FIG. 2 is a schematic diagram showing an alternative embodiment of the present invention.

Alternative embodiments of the present invention are shown in FIGS. 1 and 2. Either embodiment is advantageously used in connection with a photographic light metering system such as a built-in automatic exposure control system for a camera (not shown).

In FIG. 1 there is shown a photo diode 1 which is a signal source which senses light impinging upon it and in response provides an input signal to be memorized. Also shown are integration reset switches 2 and 3, a field effect transistor 4, a photocurrent integration capacitor 5, another field effect transistor 6, a source resistor 7 for the transistor 6, a junction transistor 8, a resistor 9, a capacitor 10, and another junction transistor 11. The resistor 9 and the capacitor 10 form an RC time constant circuit. The arrangement of the circuitry is such that transistors 6 and 8 are in source-follower and emitter-follower circuits respectively, and the source-follower and emitter-follower circuits are in a feedback arrangement for feeding back a signal to the gate of transistor 4 responsive to the source potential thereof. As is well known, the source-follower circuit has a relatively high input impedance, and the emitter-follower circuit has a relatively low output impedance.

To start the operation of memorizing the input signal, the switches 2 and 3 are switched to open conditions. Initially, even though the switch 3 is open, transistor 11 remains non-conductive. It remains non-conductive until the potential of the capacitor 10, which is charged through resistor 9, reaches the threshold level of the base-emitter junction of the transistor 11. In the interim condition before transistor 11 conducts, the field effect transistor 4 is switched into a conductive condition because the gate potential and the source potential of the field effect transistor 4 are maintained substantially constant relative to each other by the feedback arrangement. Preferably, the bias is such that the source and gate potentials are kept at equal level so that the transistor 4 is in a conductive condition. To this end, preferably, the value of the resistor 7 is so adjusted that the gate-source potential, of the source-follower or grounded-drain type field effect transistor 6 and the base-emitter potential of the emitter-follower or grounded-collector type transistor 8 cancel each other.

With the photo diode 1 receiving light while the switch 2 is open, a photocurrent corresponding to the received amount of light passes through the drain-source of the field effect transistor 4 and the capacitor 5, thereby charging the capacitor 5.

A significant feature of the apparatus is the feedback arrangement, the operation of which will now be explained. As the potential of the capacitor 5 rises owing to its being charged, the source potential of the field effect transistor 6 also rises so that the emitter potential of the transistor 8 rises. Thus, the gate potential of the field effect transistor 4 rises and the gate-source potential is always kept zero or a certain value so that the conductive-state resistance of the field effect transistor 4 is kept constant and charging through the photocurrent is made.

When, under control of the timing circuit consisting of the resistor 9 and the capacitor 10 and after a certain time, the transistor 11 becomes conductive, the gate voltage of the field effect transistor 4 reaches a negative value. If this voltage is of a value which is smaller than that of the pinchoff voltage of the field effect transistor 4, the transistor 4 switches to a non-conductive condition, the photocurrent of the photo diode 1 does not charge the capacitor 5, and the capacitor 5 is not discharged so that the charge on the capacitor 5 is memorized. The resulting voltage is memorized as the light amount integration value in case of flash light, and as the whole received light amount during the period of time, and can be employed for indication or control.

An alternative embodiment of the present invention is shown in FIG. 2. The alternative embodiment provides an instantaneous light responsive voltage memory. In FIG. 2 there are shown a photovoltaic element 20, a buffer field effect transistor 21 for obtaining the open voltage of said element 20, and a switch 22 for controlling conductivity of the transistor 11. Other circuit elements and circuit structure are the same as those of the example of FIG. 1.

When the switch 22 is closed, the photovoltaic element 20, which has received light, applies a voltage, whose value is proportional to that of the photovoltaic voltage, to the source of the field effect transistor 21. In this condition, the transistor 11 is non-conductive, so that the field effect transistor 4 is conductive. As a result, the potential of the capacitor 5 is equal to the source potential of the field effect transistor 21. When the switch 22 is opened, the transistor 11 becomes conductive, and the field effect transistor 4 becomes non-conductive; and even if the photovoltaic voltage of the photovoltaic element 20 varies, the capacitor 5 memorizes the potential of the time when the switch 22 is opened.

The advantage of the present invention is as follows: since a field effect transistor is employed as a switching element, there is no appreciable time delay such as is incident to the operation of relay switches, and because of aforementioned characteristics of the field effect transistor, light amount and photovoltaic voltage are instantaneously memorized. Since the gate-source potential of the field effect transistor is kept zero or a certain value, if the input voltage becomes greater, the conductivity resistance of the field effect transistor is not decreased. With many sorts of field effect transistors, source and drain electrodes are mutually interchangeable so that the aforementioned source and drain electrodes can mutually interchange their roles. Since the information to be memorized is the state which is transformed into current or voltage, introduction of various sensing means enables the means according to the present invention to memorize various informations.

What is claimed is:

1. Information memorizing apparatus comprising:

a field effect transistor switchable to operate in either a conductive or a non-conductive condition, the field effect transistor having gate, source, and drain electrodes;

a capacitor;

a signal source providing an input signal to be memorized;

the capacitor and the signal source each being coupled to a different one of the source and drain electrodes so that while the field effect transistor is conductive the capacitor is charged in accordance with the input signal by current flowing in series through the field effect transistor and the capacitor so as to develop thereacross a voltage, and so that while the field effect transistor is non-conductive the voltage is stored, the capacitor thereby exhibiting memory;

switching circuit means connected to the gate electrode for applying thereto a substantially constant potential while the field effect transistor is non-conductive; and feedback circuit means for maintaining a substantially constant bias potential between the gate electrode and the electrode coupled to the capacitor while the field effect transistor is conductive, the feedback circuit means having a high-impedance input connected to the capacitor and a low-impedance output coupled to the gate electrode.

2. The apparatus of claim 1 wherein the signal source is a photo diode directly coupled to the drain electrode.

3. The apparatus of claim 2 wherein the switching circuit means includes a switching transistor for selectively applying the substantially constant potential to the gate electrode so that the pinch off voltage of the field effect transistor is exceeded, thereby placing it in its non-conductive condition.

4. The apparatus of claim 3 wherein the switching circuit means includes a delay circuit.

5. The apparatus of claim 1 wherein the signal source is a photovoltaic element.

6. The apparatus of claim 5 further comprising a source follower circuit for coupling the photovoltaic element to the drain electrode of said field effect transistor.

7. The apparatus of claim 6 wherein the switching circuit means includes a switching transistor for selectively applying the substantially constant potential to the gate electrode of said field effect transistor so that the pinch off voltage of the field effect transistor is exceeded, thereby placing it in its non-conductive condition.

8. The aparatus of claim 1 wherein the feedback circuit means includes in tandem connection a source-follower circuit and an emitter-follower circuit, the source-follower circuit being connected to the capacitor, and the emitter-follower circuit producing an output voltage that is substantially equal to the voltage across the capacitor.

* * * * *